United States Patent
Heersink et al.

(10) Patent No.: US 10,926,776 B1
(45) Date of Patent: Feb. 23, 2021

(54) PROCESS TO CONTROL A NETWORKED SYSTEM OF TIME VARYING DEVICES

(71) Applicant: HRL Laboratories, LLC, Malibu, CA (US)

(72) Inventors: Byron N. Heersink, Columbus, OH (US); Heiko Hoffmann, Simi Valley, CA (US); Michael A. Warren, Northridge, CA (US)

(73) Assignee: HRL Laboratories, LLC, Malibu, CA (US)

( * ) Notice: Subject to any disclaimer, the term of this patent is extended or adjusted under 35 U.S.C. 154(b) by 222 days.

(21) Appl. No.: 16/241,854

(22) Filed: Jan. 7, 2019

Related U.S. Application Data

(60) Provisional application No. 62/642,493, filed on Mar. 13, 2018.

(51) Int. Cl.
| | |
|---|---|
| *B60W 50/00* | (2006.01) |
| *G06F 16/901* | (2019.01) |
| *G05D 1/00* | (2006.01) |
| *B60R 16/023* | (2006.01) |

(52) U.S. Cl.
CPC ......... *B60W 50/00* (2013.01); *G06F 16/9024* (2019.01); *B60R 16/023* (2013.01); *G05D 1/0088* (2013.01)

(58) Field of Classification Search
CPC .. B60W 50/00; G06F 16/9024; B60R 16/023; G05D 1/0088
See application file for complete search history.

(56) References Cited

PUBLICATIONS

Proctor et al., Dynamic Mode Decomposition with Control, 2016, SIAM J. Applied Dynamical Systems. (Year: 2016).*
Liberzon, D. (2012). Calculus of Variations and Optimal Control Theory. Princeton: Princeton University Press, pp. 180-199.
Proctor, J. L., Brunton, S. L., & Kutz, J. N. (2016). Dynamic Mode Decomposition with Control. SIAM J. Applied Dynamical Systems, 15(1), pp. 142-161.
Proctor, J. L., Brunton, S. L., & Kutz, J. N. (2016). Generalizing Koopman Theory to Allow for Inputs and Control. arXiv, 1602.07647, pp. 1-21.
Schmid, P. J. (2010). Dynamic Mode Decomposition of Numerical and Experimental Data. Journal of Fluid Mechanics, 656, pp. 5-28.

(Continued)

*Primary Examiner* — Aaron L Troost
(74) *Attorney, Agent, or Firm* — Tope-McKay & Associates

(57) ABSTRACT

Described is a control command system for generating control commands for a vehicle. The system receives a networked control system corresponding to a network of subsystems of sensors and actuators of the vehicle and data collected from sensors on the vehicle. Multiple subsystems are formed from the networked control system. A dynamic mode decomposition with control (DMDc) process is applied to each subsystem, yielding a linear approximation for each subsystem. The linear approximations are combined into a single linear approximation for the networked control system, and a linear control system approximating the networked control system is output. Control commands are generated for the vehicle based on the linear control system, which cause the vehicle to perform a vehicle operation.

15 Claims, 7 Drawing Sheets

(56) References Cited

PUBLICATIONS

Siciliano, B. & Khatib, O. (ed). (2008). Handbook of Robotics. Springer, Chapter 2.4, 44-60.
Rajesh, R. (2011). Vehicle Dynamics and Control. Springer Verlag, Chapter 2.
Stengel, Robert F. (2004). Flight Dynamics. Princeton: Princeton University Press, Chapter 3, Section 3.5 "Aerodynamic Effects of Control."

* cited by examiner

US 10,926,776 B1

PROCESS TO CONTROL A NETWORKED SYSTEM OF TIME VARYING DEVICES

CROSS-REFERENCE TO RELATED APPLICATIONS

This is a Non-Provisional Application of U.S. Provisional Application No. 62/642,493, filed in the United States on Mar. 13, 2018, entitled, "Process to Control a Networked System of Time-Varying Devices," the entirety of which is incorporated herein by reference.

GOVERNMENT LICENSE RIGHTS

This invention was made with government support under U.S. Government Contract Number N66001-16-C-4053. The government may have certain rights in the invention.

BACKGROUND OF INVENTION (1) Field of Invention

The present invention relates to a system for controlling a networked system of time-varying devices and, more particularly, to a system for controlling a networked system of time-varying devices by identifying control commands for each device such that their state assumes desired numerical values.

(2) Description of Related Art

Dynamic mode decomposition (see the List of Incorporated Literature References, Literature Reference No. 4), or DMD, is a data-driven technique for capturing the dynamics of complex systems. The output consists in a linear approximation which captures relevant features of the system often at a much lower dimension. Thus, this technique avoids the challenges inherent in trying to accurately model complex systems and allows one to obtain a faithful and practical linear approximation. Mathematically, this technique is closely related to spectral analysis of the Koopman operator associated to the dynamical system, which helps to explain the faithfulness of the resulting approximations. Dynamic mode decomposition with control (see Literature Reference No. 2), or DMDc, extends this approach to systems with control, thereby yielding analogous gains for the control of complex systems. The DMDc was then used to generalize Koopman theory to incorporate inputs and control (see Literature Reference No. 3).

Many complex dynamical systems possess an either implicit or explicit network structure. Examples of systems with explicit network structure include epidemiological networks capturing the transmission of diseases through different spatial locations or groups and social networks capturing the spread of ideas between individuals. Implicit network structure can also be extracted by examination of coupling of dynamics. Linear algebra methods, mainly the singular value decomposition and the pseudoinverse, are computationally intensive or potentially inaccurate for large systems.

Thus, a continuing need exists for a system for exploiting, when possible, existing network structure in a complex system to yield improvements over ordinary DMDc, especially when the existing network structure is acyclic.

SUMMARY OF INVENTION

The present invention relates to a system for controlling a networked system of time-varying devices and, more particularly, to a system for controlling a networked system of time-varying devices by identifying control commands for each device such that their state assumes desired numerical values. The system comprises one or more processors and a non-transitory computer-readable medium having executable instructions encoded thereon such that when executed, the one or more processors perform multiple operations. The system receives, as input, a networked control system corresponding to a network of subsystems comprising sensors and actuators of a vehicle and data collected from the sensors; forming a plurality of subsystems from the networked control system; applying a dynamic mode decomposition with control (DMDc) process to each subsystem, yielding a plurality of linear approximations, one linear approximation for each subsystem; combining the plurality of linear approximations into a single linear approximation for the networked control system; outputting a linear control system approximating the networked control system; and generating control commands for the vehicle based on the linear control system, wherein the control commands cause the vehicle to perform a vehicle operation.

In another aspect, the networked control system comprises a network structure having a plurality of vertices, each vertex representing a state space of a subsystem of the vehicle, wherein a directed edge connecting a pair of vertices represents a situation in which a state of a first vehicle component has a direct dynamical effect on a state of a second vehicle component.

In another aspect, the DMDc process is only applied to connected vertices.

In another aspect, the networked control system comprises a directed graph with vertices partitioned into two disjoint sets: a set of system components, $N = v1, \ldots, uv$, and a set of inputs, $I = e1, \ldots, e\mu$, wherein edges connected to the vertices in the set of inputs are only directed outward from those vertices.

In another aspect, each vertex $w$ in $N \cup I$ is associated with a set $Pw$ that represents a component of the networked control system, wherein if $w \in N$, then $Pw$ is a component of a state space of the networked control system, while if $w \in I$, then $Pw$ is a component of an input space of the networked control system.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
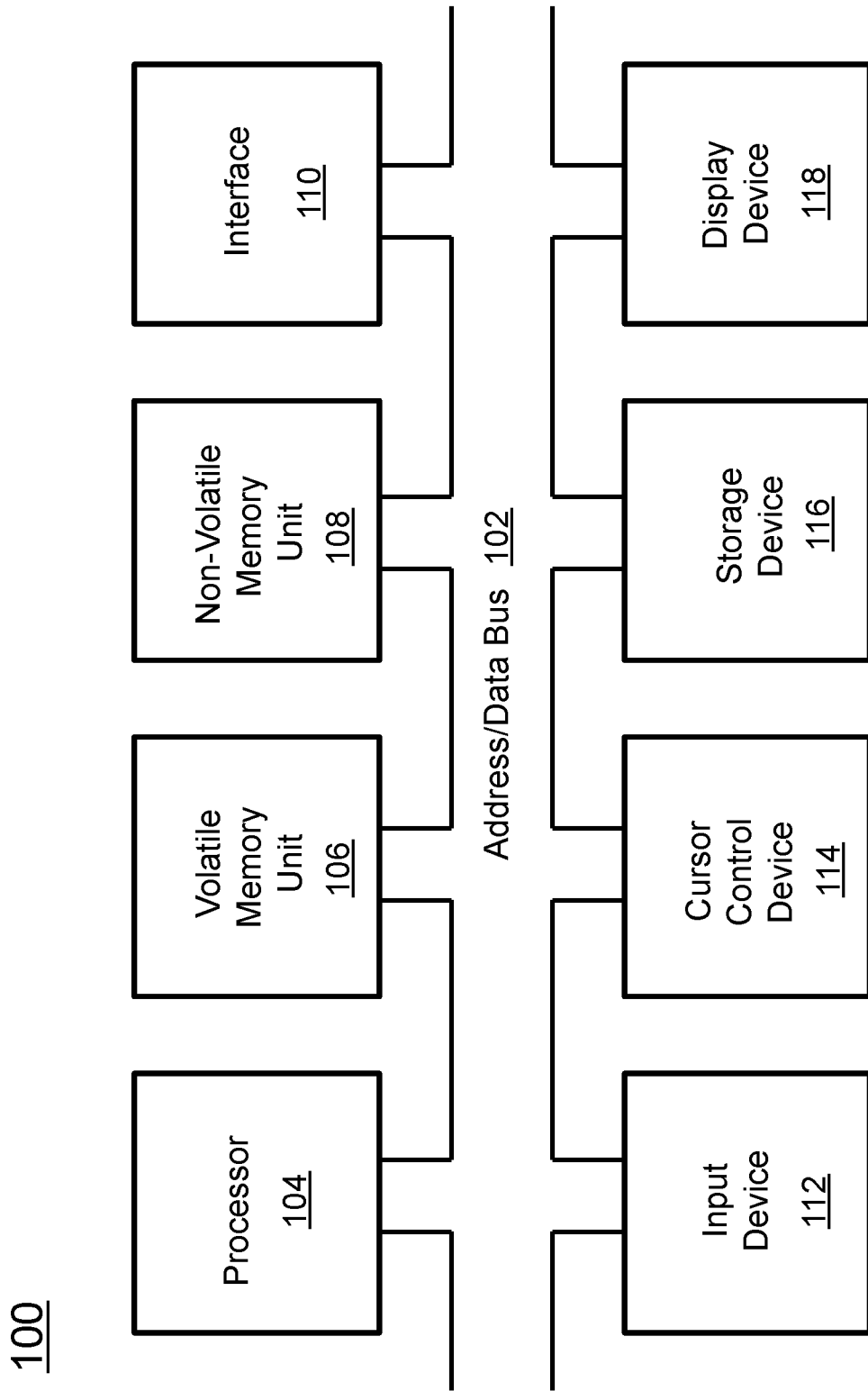
FIG. 1 is a block diagram depicting the components of a system for controlling a networked system of time-varying according to some embodiments of the present disclosure.

The present invention relates to a system for controlling a networked system of time-varying devices and, more particularly, to a system for controlling a networked system of time-varying devices by identifying control commands for each device such that their state assumes desired numerical values. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) List of Incorporated Literature References

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number, as follows:

1. Liberzon, D. (2012). Calculus of Variations and Optimal Control Theory. Princeton: Princeton University Press, pages 180-199.

2. Proctor, J. L., Brunton, S. L., & Kutz, J. N. (2016). Dynamic Mode Decomposition with Control. SIAM J. Applied Dynamical Systems, 15(1), 142-161.

3. Proctor, J. L., Brunton, S. L., & Kutz, J. N. (2016). Generalizing Koopman Theory to Allow for Inputs and Control. arXiv, 1602.07647.

4. Schmid, P. J. (2010). Dynamic Mode Decomposition of Numerical and Experimental Data. Journal of Fluid Mechanics, 656, 5-28.

5. Siciliano, B. & Khatib, O. (ed). (2008). Handbook of Robotics. Springer, Chapter 2.4, 44-60.

6. Rajesh, R. (2011). Vehicle Dynamics and Control. Springer Verlag, Chapter 2.

7. Stengel, Robert F. (2004). Flight Dynamics. Princeton: Princeton University Press, Chapter 3.

(2) Principal Aspects

Various embodiments of the invention include three "principal" aspects. The first is a system for controlling a networked system of time-varying devices. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm as described herein. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
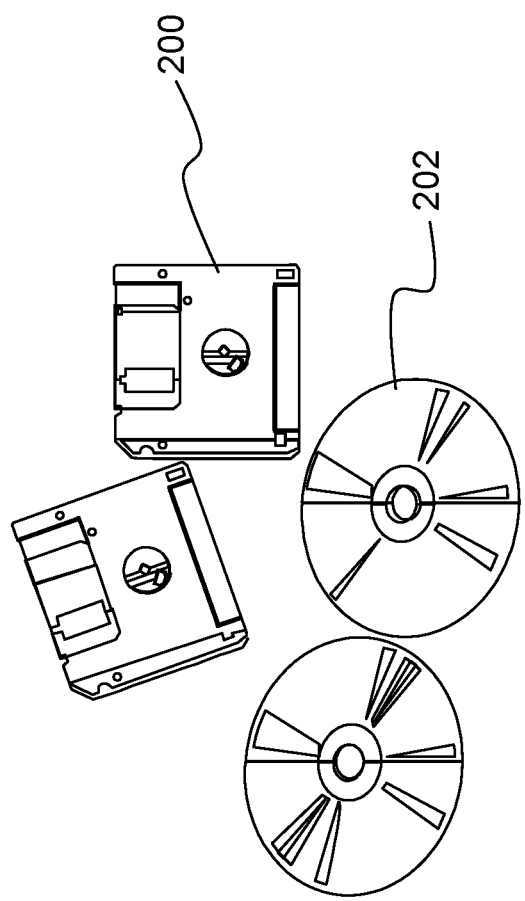
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Specific Details of Various Embodiments

Described is a process to control a networked system of time-varying devices. A time varying device is a machine with a state that changes over time and a control input that can change that state. Non-limiting examples of time-varying devices include a motorized joint of a robot or a wheel of a vehicle with a velocity encoder. A velocity encoder can be used to perform velocity measurements using the linear relationship between an encoder's pulse frequency and its rotational velocity. As the velocity encoder rotates faster, the pulse frequency increases at the same rate.

An objective of the system described herein is to find control commands for each device (e.g., vehicle) such that their state assumes desired numerical values determined by the system developers or users. For example, for traction control in a vehicle, the desired numerical values can be the values that represent a vehicle state where the wheels don't slip on the ground. A key component of the invention described herein is a method to find a linear approximation of the dynamics of the entire networked system from data. Once such an approximation has been found, standard control methods can be used to compute the control commands. Non-limiting examples of such methods are solutions to optimal control, such as the linear quadratic regulator (see Literature Reference No. 1). An example of a linear approximation of dynamics of a networked system is the following. Assuming the following dynamics $x=f(x)$, then the following is a linear approximation in a sufficiently small region of x: x=Ax+c, where x is a vector, f is a non-linear function, A is a matrix, and c is a constant vector.

Dynamic mode decomposition (see Literature Reference No. 4), or DMD, is a data-driven technique for capturing the dynamics of complex systems. Data-driven refers to the fact that the inputs to the technique are raw data (e.g., time-series collected from sensors), and the process is equation-free in the sense that a proposed dynamic model of the system is not required. The output consists in a linear approximation which captures relevant features of the system often at a much lower dimension. Thus, the technique according to embodiments of the present disclosure avoids the challenges inherent in trying to accurately model complex systems and allows one to obtain a faithful and practical linear approximation.

Mathematically, this technique is closely related to spectral analysis of the Koopman operator associated to the dynamical system which helps to explain the faithfulness of the resulting approximations. Dynamic mode decomposition with control (see Literature Reference No. 2), or DMDc, extends this approach to systems with control, thereby yielding analogous gains for the control of complex systems. The DMDc was then used to generalize Koopman theory to incorporate inputs and control (see Literature Reference No. 3). The invention described herein is a further extension of DMDc to networked control systems. This algorithm is referred to as Network Dynamic Mode Decomposition with Control, or Network DMDc, which can then be harnessed to extend Koopman theory to networks.

Many complex dynamical systems possess an either implicit or explicit network structure. Examples of systems with explicit network structure include epidemiological networks capturing the transmission of diseases through different spatial locations or groups, social networks capturing the spread of ideas between individuals, and so forth. Implicit network structure can also be extracted by examination of coupling of dynamics. A unique aspect of the invention is that it allows the ability to exploit, when possible, existing network structure in a complex system to yield improvements over ordinary DMDc. These improvements are especially dramatic when the network in question is acyclic.

(3.1) DMDc Algorithm

The DMDc algorithm is performed on two sequences of vectors $z0, \ldots, zm \subseteq \mathbb{R}\,n$ and $\gamma0, \ldots \gamma m \subseteq \mathbb{R}\,1$, which are taken to be vertical, that represent measurements on a control system. If the control system is a vehicle, then the state can be a velocity of the vehicle, as measured by a sensor such as a rotational-velocity sensor at a wheel of the vehicle (e.g., autonomous vehicle, robot). The measurements depend on the state of the system. The control input (e.g., engine acceleration) will change the state of the system as well as the measurements. In the example of a multi-limbed robot which measures the location of surrounding landmarks or optical flow in order to explore its environment to perform operations, such as picking up an object, the state variable is the velocity or angular velocity of the robot body which is measured by a camera.

The vectors $zj$ are thought of as being sequential measurements on the state space of the system (or the state of the system itself) over time. The vectors $yj$ are thought of as being the measurements on the control input space (or the value of the control input itself) at the corresponding times. The following matrices are formed:

$$Z = z0\,z1 \ldots zm{-}1$$

$$Z' = z1\,z2 \ldots zm$$

$$\Gamma = \gamma0\,\gamma1 \ldots \Gamma m{-}1.$$

The goal of the DMDc algorithm is to model this data according to a linear control system, that is, to find appropriate matrices A and B such that $$Z' \approx AZ = B\Gamma.$$

In other words, if $\Omega = Z\Gamma$, $G = AB$ needs to satisfy $Z' \approx G\Omega$. Define G to be $G = AB = Z'\Omega\dagger$, where $\Omega\dagger$ denotes the Moore-Penrose pseudoinverse of $\Omega$. The matrix $Z'\Omega\dagger$ is an ideal candidate for G since it is the matrix minimizing $G\Omega{-}Z'F$, where $\cdot F$ denotes the Frobenius norm. If $G\Omega = Z'$, then $X = G$ is the solution of $X\Omega = Z'$ minimizing XF. However, for sufficiently large systems, the computation of G can become expensive. To mitigate this problem, the DMDc algorithm computes a reduced-order model for G. This algorithm is described as follows:

(1) Compute the reduced and truncated SVD of $\Omega$:

$$\Omega \approx U\Sigma V^*,$$

and let p be the truncation value so that $U \in \mathbb{R}\,n{+}l{\times}p$, $\Sigma \in \mathbb{R}\,p{\times}p$, and $V^* \in \mathbb{R}\,p{\times}p$. Note that $$G \approx Z'V\Sigma{-}1U^*,$$

$$AB = Z'V\Sigma{-}1 {*} Z'V\Sigma{-}1U2^*,$$

where $U1^* \in \mathbb{R}\,n{\times}p$ and $U2^* \in \mathbb{R}\,l{\times}p$ such that $U^* = U1^* U2^*$.

(2) Compute the reduced and truncated SVD of Z':

$$Z' \approx U\Sigma V^*,$$

and let r be the truncation value so that $U \in \mathbb{R}\,n{\times}r$, $\Sigma \in \mathbb{R}\,r{\times}r$, and $V^* \in \mathbb{R}\,r{\times}m$.

(3) Compute the reduced-order model AB of AB as $$AB = U^*Z'V\Sigma{-}1U1 {*} UU^*Z'V\Sigma{-}1U2^*.$$

The DMDc algorithm also includes the computation of certain eigenvalues and eigenvectors of A, which are omitted here since only the computation of AB is relevant to Network DMDc described below.

The reduced-order model for the state space measurements is then $\mathbb{R}\,r$, and we think of the reduced-order measurement corresponding to $z \in \mathbb{R}\,n$ as $z = U^*z \in \mathbb{R}\,r$. On the other hand, the reduced-order measurement z relates to the original measurement as $z = Uz$. Intuitively, $U^*$ is a projection from the original measurements to the reduced-order measurements, and U is an embedding in the reverse direction. $U^*$ is a left-inverse of U.

(3.2) Koopman Theory With Control

The DMDc algorithm leads to Koopman theory, which incorporates control inputs. Consider a discrete control system, that is, a function of the form $T: U \times M \to M$, where M is the state space of the system, and U is the space of control inputs. The trajectories of this system are sequences $x0, x1, \ldots$ in M, with corresponding input sequences $u0, u1, \ldots$ in U such that $xk{+}1 = T(uk, xk)$. In Literature Reference No. 3, the Koopman operator K acts on the space of observables $g: U \times M \to \mathbb{R}$, and is defined by the following:

$$Kgu,x = g^*, Tu,x$$

where * can be chosen in different ways. This ambiguity is avoided by restricting the domain of K to the observables with domain M so that for a given observable $g: M \to \mathbb{R}$, $Kgu,x = g(Tu,x)$. K is thought of as a linear operator mapping a vector space of observables on M to another vector space of observables on $U \times M$.

The DMDc algorithm is applied to better understand K, and therefore T, as follows. Let $g:M \to \mathbb{R}^n$ and $h:U \to \mathbb{R}^l$ be (vertical) vectors of observables on M and U, respectively. Then, for a given trajectory $u_0, x_0, u_1, \ldots, (u_m, x_m)$ of the control system, let $$Z = z_0 z_1 \ldots z_{m-1} = g(x_0) g(x_1) \ldots g(x_{m-1})$$

$$Z' = z_1 z_2 \ldots z_m = g(x_1) g(x_2) \ldots g(x_m)$$

$$\Gamma = \gamma_0 \gamma_1 \ldots \gamma_{m-1} = h(u_0) h(u_1) \ldots h(u_{m-1}).$$

Then as above, define $G = AB = Z'\Omega^\dagger$ to be the matrix of best fit to model the behavior of g by linear control:

$$g x_{k+1} \approx A g x_k + B h u_k.$$

One can apply DMDc to obtain, if necessary, a reduced-order model of G and to obtain dynamic modes for A.

(3.3) Network DMDc Algorithm

Now that the DMDc algorithm and Koopman theory with control inputs have been described, the following is an explanation of their extension to networked systems. Network DMDc is presented in the context of Koopman theory due to its generality. First, a networked control system is defined. Let G be a directed graph with vertices partitioned into two disjoint sets: a set of system components, $N = v_1, \ldots, u_v$, and a set of inputs, $I = e_1, \ldots, e_\mu$, such that the only edges connected to the vertices in I are directed outward from those vertices. We associate each vertex w in $N \cup I$ with a set $P_w$ that represents a component of the control system. If $w \in N$, then $P_w$ is a component of the state space of the system, while if $w \in I$, $P_w$ is a component of the input space. The entire state space is therefore $v \in N P_v$ and the entire input space is $e \in I P_e$. The set I is allowed to be empty, in which case the system is autonomous.

For $v \in N$, let $I_v \subseteq N \cup I$ be the set of vertices having an outgoing edge pointing into v. Then, there is the transition function $T_v: w \in I_v P_w \times p_v \to P_v$, which governs the behavior of component $P_v$: if $x_w w \in N \cup I$ are the state and input components of the system at a particular time, the $P_v$ component of the state at the following time is $T_v(x_w w \in I_v, x_v)$. Thus, the edges of G represent the pattern of influence the different components of the system have on one another. The individual transition functions can then be composed to produce the transition function $T: e \in I P_e \times v \in N P_v \to v \in N P_v$ of the entire system. Thus, the graph G, the state and input spaces $P_w$, and the transition functions $T_v$ define a networked control system.

The following is an explanation of the Network DMDc algorithm as applied to the networked system. The basic idea is to apply the original DMDc algorithm to get a "local" analysis of the behavior of the system at each state space component $P_v$ in response to the components it is immediately influenced by. The resulting linear control systems can then be composed to obtain a linear system approximating the whole network. As input a trajectory $u_0, x_0, u_1, x_1, \ldots, (u_m, x_m)$ of the whole control system is needed, with $u_k \in e \in I P_e$ and $x_k \in v \in N P_v$. Denote the $P_{v_j}$ component of $x_k$ as $x_{k,j}$, and the $P_{e_j}$ component of $u_k$ as $u_{k,j}$. Then let $g: j=1v P_{v_j} \to \mathbb{R}^n$ and $h: j=1\mu P_{e_j} \to \mathbb{R}^l$ be observables of the form:

$$g = g_1 g_v$$

and $$h = h_1 h_\mu,$$

where $$g_j: P_{v_j} \to \mathbb{R}^{n_j}, \ j=1, \ldots, v$$

$$h_j: P_{e_j} \to \mathbb{R}^{l_j}, \ j=1, \ldots, \mu.$$

Figure 3:
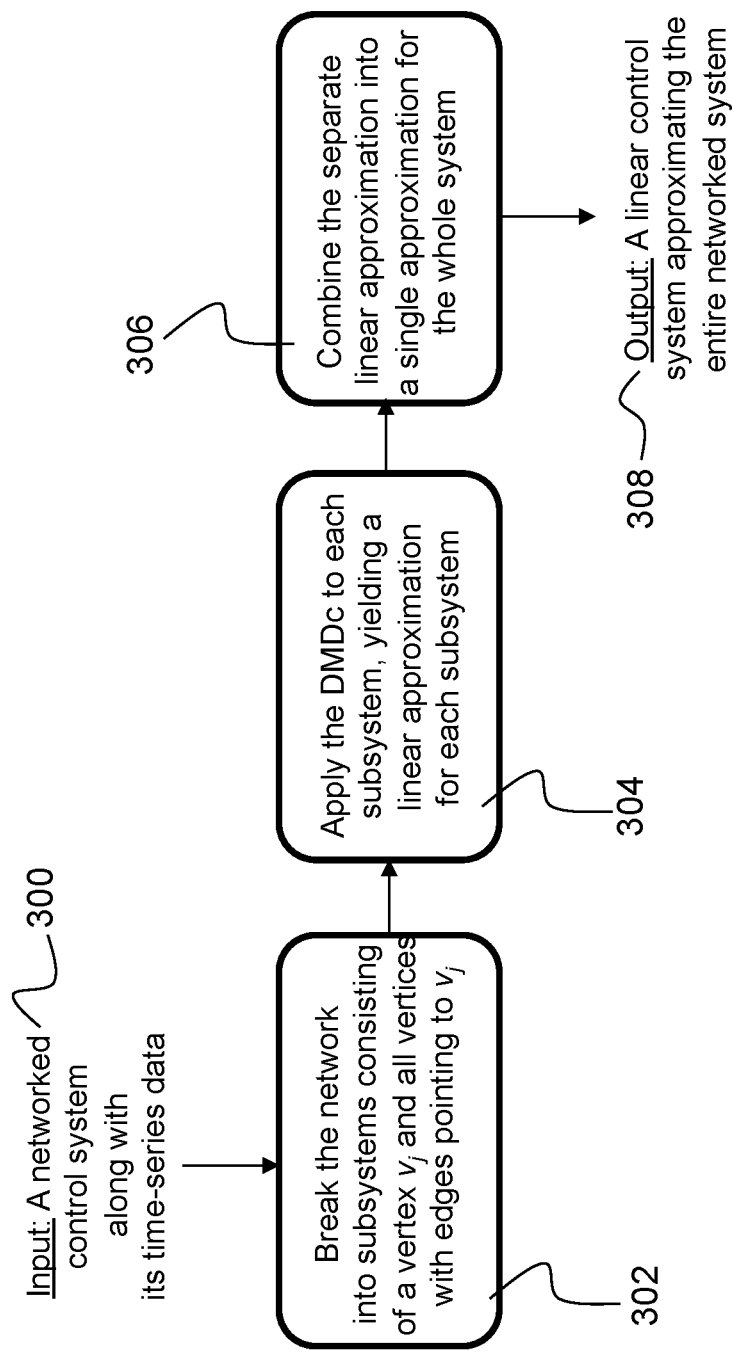
FIG. 3 is a flow chart illustrating the network dynamic mode decomposition with control (DMDc) process according to some embodiments of the present disclosure.

As shown in FIG. 3, the system receives as input a networked control system along with its time-series data (element 300). The network is divided into subsystems consisting of a vertex $v_i$ and all vertices with edges pointing to $v_i$ (element 302). In other words, subsystems are centered at each state vertex. Specifically, for each $v_j \in N$, consider the system consisting of $v_j$, which is thought of as the state vertex of the subsystem, and $I_j = e\ell j1, e\ell j(2), \ldots, e\ell j\beta j, v_k j1, v_k j2, \ldots, v_k j(\alpha j)$, which is thought of as the set of input vertices of the subsystem. Next, the observable $h(j)$ on $w \in I_j P_w$ is defined by:

$$h(j) = h\ell j1 h\ell j\beta j g_{kj1} g_{kj\alpha j}.$$

Then, the triple $Z_j, \Gamma_j, Z_j'$ is defined by:

$$Z_j = g_j \times 0, j g_j \times 1, j \ldots g_k \times m-1, j$$

$$Z_j' = g_j \times 1, j g_j \times 2, j \ldots g_j \times m, j$$

$$\beta_j = h_{j u 0}(j) h_{j u 1}(j) \ldots h_{j u m-1}(j)$$

where $u_k(j) = u_k, \ell j(1), \ldots, u_k, \ell j \beta j, x_k, k j 1, \ldots, x_k, k j(\alpha j)$ for $$k = 0, \ldots, m-1.$$

As shown in FIG. 3, the subsystem centered at $v_j$ is analyzed by applying the DMDc to $Z_j, \Gamma_j, Z_j'$, or each subsystem, yielding a linear approximation for each subsystem (element 304). In the case where a reduced-order model is not sought, the DMDc yields matrices $A_{j,j}, B_j$ that model the behavior of $g_j$ by linear control:

$$g_j x_{k+1}, j \approx A_{j,j} g_j x_k, j = B_j h_j u_k j,$$

which can be rewritten as:

$$g_j x_{k+1}, j \approx A_{j,j} g_j x_k, j + i=1 \alpha_j A_j, k j i g_k j i x_k, k j i + i=1 \beta_j B_j,$$
$$\ell j i h \ell j i u_k, \ell j i.$$

Repeating this process for every $j=1, \ldots, v$ gives us a linear control approximation for each local subsystem. As depicted in FIG. 3, these approximations are combined to obtain one for the whole system (element 306). That is, the separate linear approximations are combined into a single linear approximation for the whole system. Indeed, $A_{j,i}$ can be defined to be the zero matrix in $\mathbb{R}^{n_j \times n_i}$ if there is not an edge in G from $v_i$ to $v_j$, and similarly let $B_{j,i}$ be zero in $\mathbb{R}^{n_j \times l_i}$ if there is not an edge from $e_i$ to $v_j$. Then, there is the following:

$$g x_{k+1} \approx A g x_k + B h u_k,$$

where $$A = A_{1,1} A_{1,2} \ldots A_{1,v} A_{2,1} A_{2,2} \ldots A_{2,v} A_v,$$
$$1 A_v, 2 \ldots A_{v,v}$$

and $$B = B_{1,1} B_{1,2} \ldots B_{1,\mu} B_{2,1} B_{2,2} \ldots B_{2,\mu} B_v,$$
$$1 B_v, 2 \ldots B_v, \mu.$$

In the case where a reduced-order model is sought in the applications of the DMDc, then for each $j=1, \ldots, v$, the process yields matrices $$A_{j,j} = U_j^* A_{j,j} U_j, \ A_{j,k j(i)} = U_j^* A_{j,k j(i)}, \ B_j, \ell j(i) =$$
$$U_j^* B_j, \ell j(i),$$

such that $$g_j x_{k+1}, j \approx A_{j,j} g_j x_k, j + i=1 \alpha_j A_j, k j i g_k j i x_k, k j i + i=$$
$$1 \beta_j B_j, \ell j i h \ell j i u_k, \ell j i,$$

where $$g_j = U_j^* g_j.$$

Let $$A_{j,k} = A_{j,k}U_k,$$

then $$g_j x_{k+1,j} \approx A_{j,j} g_j x_{k,j} + \sum_{i=1}^{\alpha_j} A_{j,k_{ji}} g_{k_{ji}} x_{k,k_{ji}} + \sum_{i=1}^{\beta_j} B_{j,\ell_{jih}} \ell_{jiu_{k,\ell_{ji}}}.$$

Also, letting $A_{j,i}$ be the zero matrix of the appropriate size if there is not an edge in G from $v_i$ to $v_j$, a reduced-order approximation of the entire system is obtained according to the following:

$$g x_{k+1} \approx A g x_k + B h u_k,$$

where $$g = g_1 g_2 g_v, \; A = A_{1,1} A_{1,2} \ldots A_{1,v} A_{2,1} A_{2,2} \ldots A_{2,v} \; A_{v,1} A_{v,2} \ldots A_{v,v}$$

and $$B = B_{1,1} B_{1,2} \ldots B_{1,\mu} B_{2,1} B_{2,2} \ldots B_{2,\mu} B_{v,1} B_{v,2} \ldots B_{v,\mu}.$$

The output of the process is a linear control system approximating the entire networked system (element 308).

The Network DMDc algorithm according to embodiments of the present disclosure can be applied not only to discrete-time systems as described above, but also to continuous-time systems (as can the standard DMD and DMDc), where the transition functions $T_j$ are replaced by differential equations of the form $dx_v dt = f_v(x w w \in I_v, x_v)$, where $f_v$ is a function on $w \in I_v P_w \times P_v$. Specifically, one can apply Network DMDc to a continuous-time system's state and input data taken at regularly-spaced points in time to yield an approximating linear discrete-time system. Assuming the time spacing is fine enough, one could potentially use this approximation to yield an approximating continuous-time system. An example of a network of coupled differential equations can be found in Literature Reference No. 5, which shows a computation of coupled differential equations for a multi-linked robot. Literature Reference Nos. 6 and 7 describe examples of coupled differential equations for a driven ground vehicle and aircraft (e.g., flying vehicle, drone), respectively.

Figure 4:
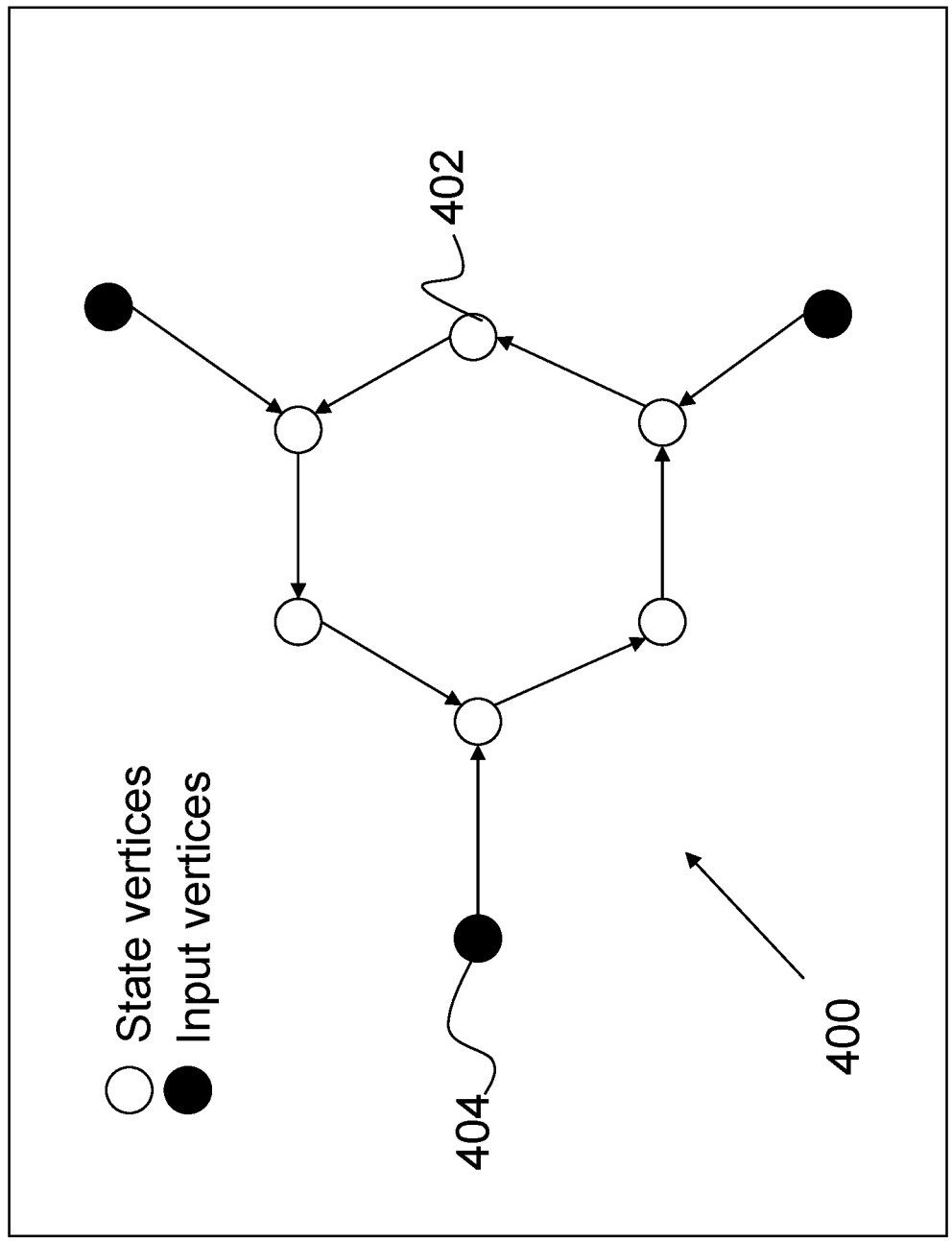
FIG. 4 is an illustration of a circular network with six state vertices and three input vertices according to some embodiments of the present disclosure.

The following is an example of Network DMDc and some of its advantages. Consider a circular network with state vertices $v_1, \ldots, v_n$ such that for $i=1, \ldots, n-1$, there is a directed edge from $v_i$ to $v_{i+1}$, and there is another edge from $v_n$ $v_1$. Additionally, the network has input vertices $e_1, \ldots, e_m, (m \leq n)$ each having a single edge pointing to one state vertex. On the other hand, there is at most one edge pointing to a given state vertex from an input vertex. FIG. 4 illustrates an example of this type of network. The space $P_w$ corresponding to each vertex w is the real line $\mathbb{R}$. The dynamics of a given state vertex $v_j$ are described as follows. If $x \in \mathbb{R}$ is the current state of $v_j$, $y \in \mathbb{R}$ is the current state of $v_{j-1 (\mod n)}$, and, if $v_j$ is connected to an input vertex, $z \in \mathbb{R}$ is that vertex's input value, then the state $x'$ of $v_j$ after a time step is given by $x' = a_j x + b_j y + c_j z$, where $a_j$, $b_j$, $c_j$ are fixed real numbers corresponding to $v_j$. If $v_j$ is not connected to an input vertex, the term $c_j z$ is ignored.

(3.4) Experimental Studies

The Network DMDc was tested and compared with the standard DMDc by seeing how effectively both can recover the linear dynamics of a number of circular networks of the type described above, having various sizes and parameters. Specifically, simulations of the network of various time lengths were performed, where the values of the input vertices were randomly sampled from a uniform distribution on a finite interval. Then, for each simulation, the matrices AB that result from applying both algorithms to the data as described above were obtained, and a measurement was taken of how close they were to the matrix giving the actual dynamics of the network. The measure of closeness used was the Frobenius norm of the difference of the two matrices. Attempting to obtain the most accurate results, AB was computed for the DMDc as simply $Z'\Omega\dagger$.

Figure 5:
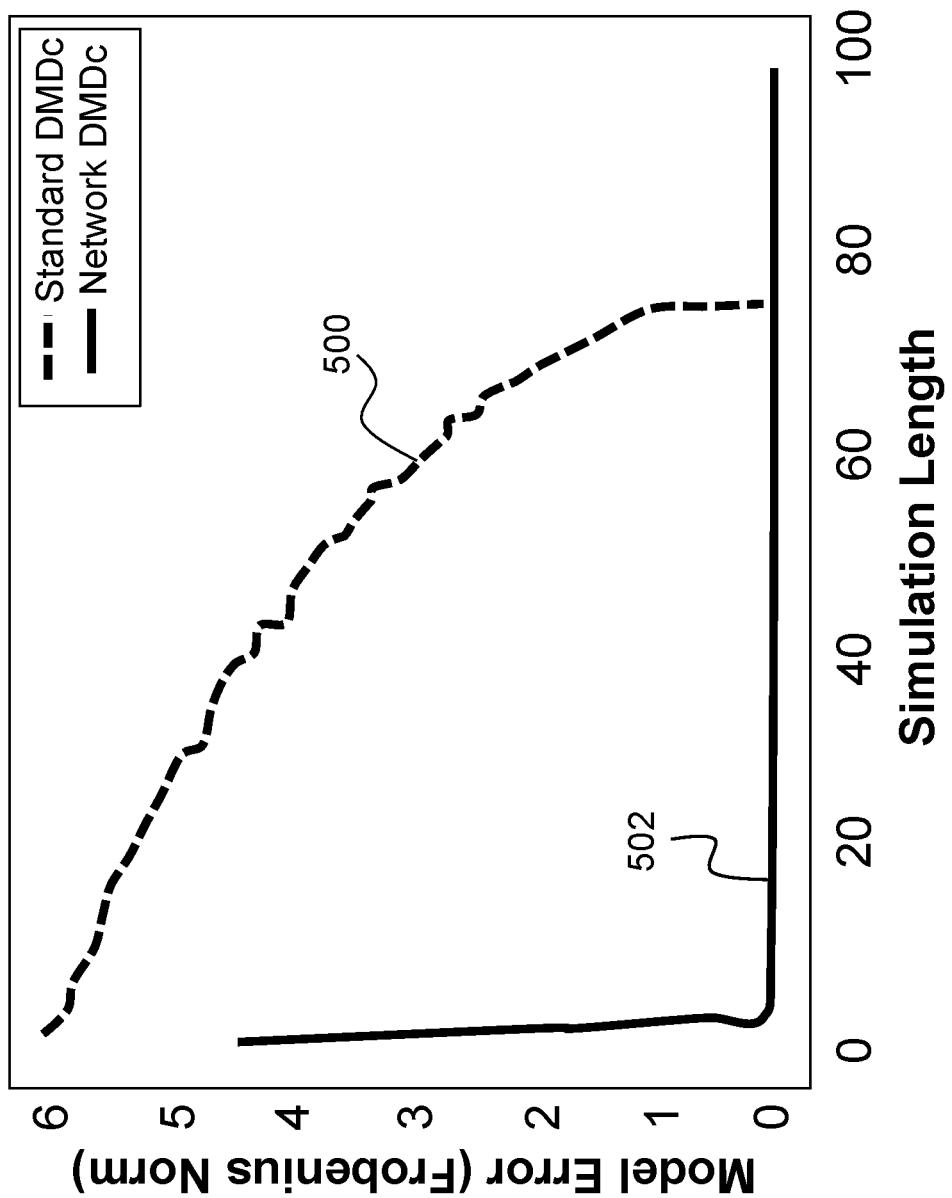
FIG. 5 is a plot illustrating error in the results of the standard and network DMDc over a range of simulation lengths according to some embodiments of the present disclosure.
Figure 6:
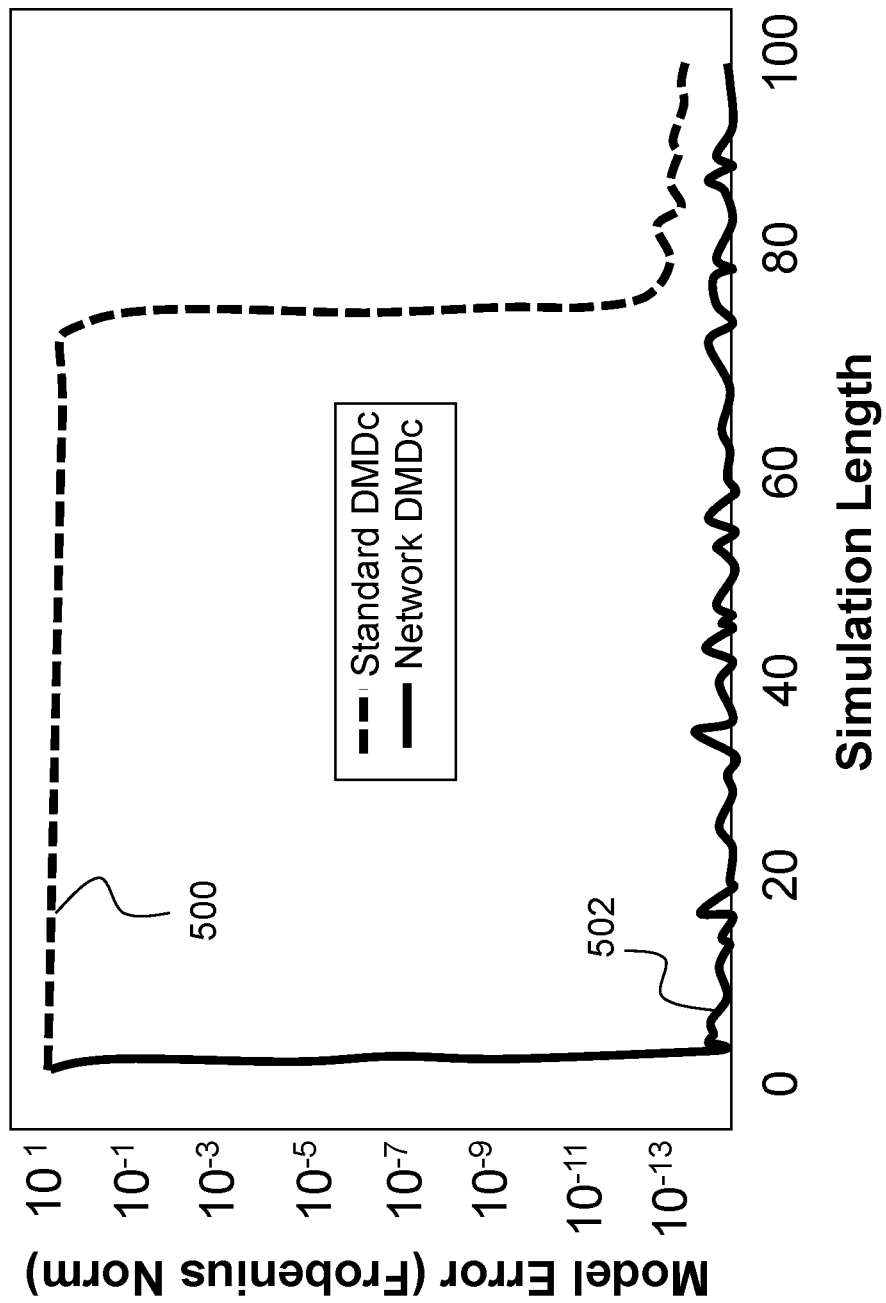
FIG. 6 is a plot illustrating log scale of the accuracy results of the standard and network DMDc according to some embodiments of the present disclosure.

Network DMDc was consistently more accurate than standard DMDc throughout the tests. Particularly, simulations of small length were sufficient to recover the actual dynamics to within a negligible error; the simulation lengths required by standard DMDc were much larger. FIG. 4 is an illustration of a circular network 400 with six state vertices (represented by unfilled circles 402) and three input vertices (represented by filled circles 404). FIGS. 5 and 6 depict the results for a circular network with 50 state vertices, every other of which is connected to an input vertex (analogous to the smaller circular network 400 in FIG. 4).

Specifically, FIG. 5 is a plot depicting the error in the results of the standard and network DMDc over a range of simulation lengths, where the standard DMDc results are represented by the dashed curve 500, and the network DMDc results according to embodiments of the present disclosure are represented by the solid curve 502. FIG. 6 is a plot showing log scale of the accuracy results of the standard and network DMDc, where the standard DMDc results are represented by the dashed curve 500, and the network DMDc results according to embodiments of the present disclosure are represented by the solid curve 502.

In addition, the parameters $a_j, b_j, c_j$ are chosen randomly from a uniform distribution on the interval $[-1,1]$, and the values for the input vertices were chosen from a uniform distribution on $[-10,10]$. Note that for each simulation length, the input data for the standard DMDc was the same as that for the network DMDc, so that the accuracy comparison was fair.

For the simulation depicted by FIGS. 5 and 6, the standard DMDc required a simulation length of 75 to recapture the actual dynamics to within a negligible error, whereas the Network DMDc required only a simulation length of 3. Note that 75 is the dimension of the system defined by the entire network, and 3 is the maximum dimension of a "local" system consisting of one state vertex v and all the state and input vertices having edges pointing to v. Recall that the Network DMDc is based on applying the regular DMDc to each such local system. This makes sense because, in the first case, a simulation length of 75 would make the matrix $\Omega = Z\Gamma$ a square matrix, and in the second case, a simulation length of 3 would make the matrices $Z_j\Gamma_j$ square or have more columns than rows. It is then possible that both matrices have right inverses, in which case both algorithms would yield the correct dynamics, up to computational error. Problems could arise if the data are correlated in a way so as to make the rows of $\Omega$ or $Z_j\Gamma_j$ linearly dependent. Therefore, Network DMDc can have a great computational advantage not only for the circular networks described above, but more generally for any network whose local systems described above have a significantly smaller dimension than that of the system as a whole (e.g., systems whose nodes have few incoming edges, relative to the size of the network). Additionally, it is expected that this advantage will carry over to the analysis of nonlinear systems, for which it could be necessary to carry out a delicate analysis for what the observables $g_j, h_j$ (and in particular, their nonlinearities) should be, which would likely be more tractable than doing the same for the whole system at once.

In summary, the system described herein simplifies the control of complex machinery (i.e., networked control system), such as a traction-control system of an autonomous vehicle. The system in the vehicle receives as input the state of the networked devices in real time. The invention described herein then analyzes the dynamics of the networked system as quickly as possible to allow (near) optimal control. The Network DMDc according to embodiments of the present disclosure provides data-driven analysis of complex systems, particularly those resulting in linear approximations of the systems, taking advantage of any network structure in systems to provide an improved approximation over those of the standard DMD and DMDc. A linear approximation is often required to make such systems computationally tractable. Based on such linear approximations, established control methods can be used.

The kind of network structure that is considered is one which depicts the interaction of different components. For example, a network having nodes 1 and 2 and a directed edge from node 1 to node 2 represents a system having two components, one for each node such that the state of the first component has a direct dynamical effect on that of the second components, represented by the edge. The advantages of the Network DMDc described herein stems from its use of this type of network structure to divide systems down into smaller subsystems, each of which are analyzed separately. This process allows for improvements in computation time and precision.

A computational advantage of Network DMDc is that it analyzes only the dynamical interactions of the components of the system which are directly connected and cuts out the computation associated with unconnected components, which would normally take place in DMD and DMDc. Another advantage of the process is that it lends itself to parallel computation, where the different components of a system can be analyzed in parallel. Somewhat analogously, one can likely use Network DMDc in tandem with distributed control theory for the effective control of systems. The methods DMD and DMDc generally require as input time series data of a system to perform analysis, and larger systems require data over a longer time span. Furthermore, the linear algebra-based techniques of DMD and DMDc are more liable for computational inaccuracy in larger systems. By analyzing smaller subsystems, Network DMDc has the potential to capture the dynamics of a large system using data over a relatively short timeframe and with more precision.

The invention described herein is applicable to vehicle manufacturing companies which have interest in complex systems possessing network structure, such as vehicles. Additionally, companies having interest in social networks (e.g., how opinions regarding consumer products spread on social media) and coordinated networks of platforms they produce (e.g., vehicle-to-vehicle (V2V) communications, satellite networks, drone networks). V2V communications form a wireless ad hoc network on the roads, allowing vehicles to "talk" to each other. Network DMDc is useful in modeling, simulating, and developing control algorithms for the design and analysis of such systems.

Figure 7:
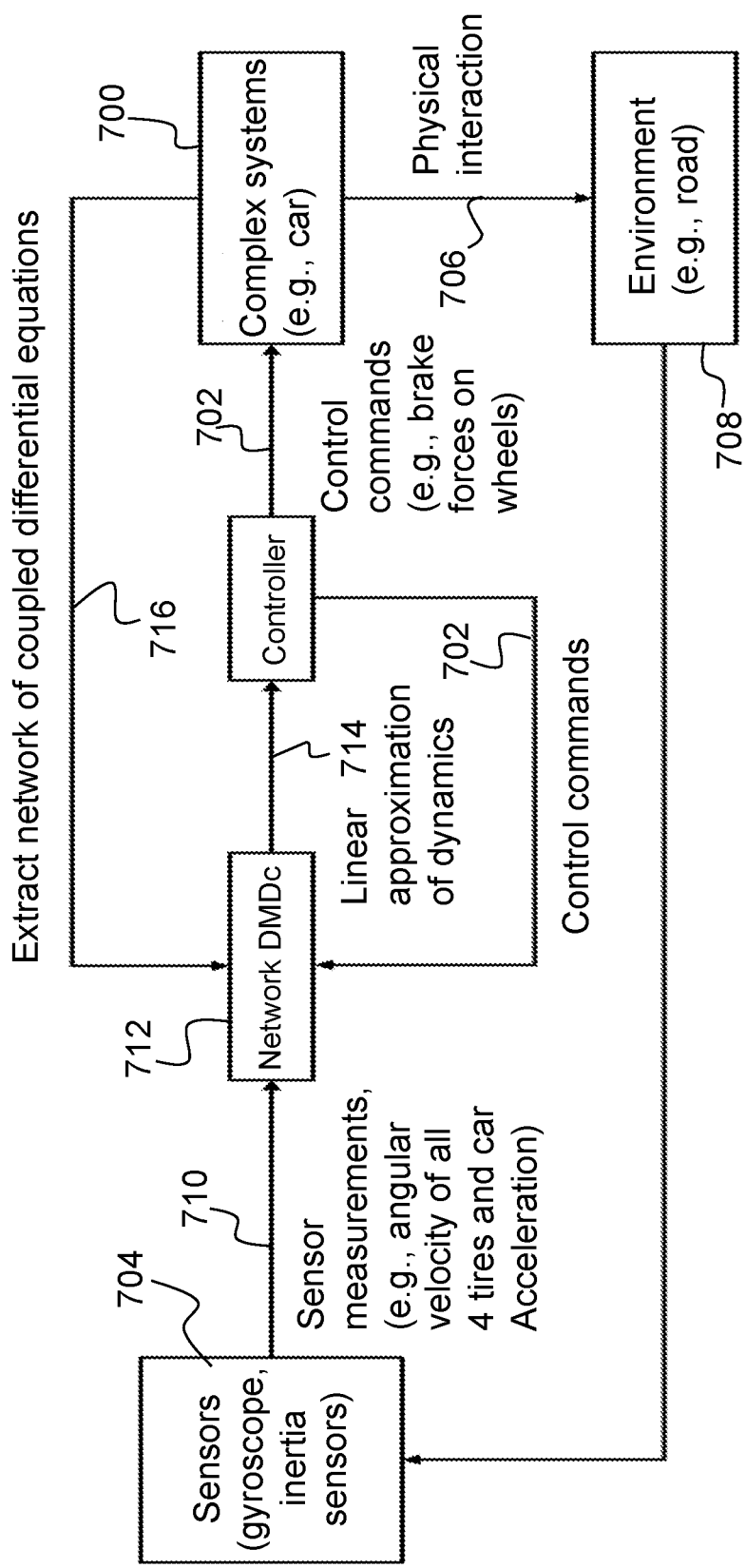
FIG. 7 is a flow chart illustrating a process to control a complex dynamical system according to some embodiments of the present disclosure.

As a non-limiting example, once the dynamics are captured, they are then used in a control system to perform a vehicle operation involving the control of position of the vehicle, speed (e.g., braking or acceleration operation), and/or maneuvering (e.g., steering operation). FIG. 7 is a flow diagram illustrating the process for controlling a complex system 700. As described above, the objective is to find control commands 702 such that the complex system 700 assumes a desired goal state (e.g., traction control). One component is a method to find a linear approximation of the dynamics of the entire (networked) complex system 700 from data. These data are collected from sensors 704 during operation of the complex system 700 and its physical interaction 706 in its environment 708 (e.g., road). The data includes the system's sensor measurements 710 and control variables, where the sensor measurements depend on the complex system's 700 state. The network DMDc 712 is applied to the sensor measurements 710, yielding a linear approximation of dynamics 714. Once such an approximation has been found, standard control methods can be used to compute the control commands 702 (e.g., brake forces on wheels) to act on the complex system 700. As an example, a wheel of an autonomous vehicle can be controlled to maintain a desired rotational velocity. In this example, the state is the rotational velocity and the control is the torque on the wheel axis. The linear equation will describe the rotational acceleration (derivative of velocity) as a function of the rotational velocity and the torque. Literature Reference No. 1 describes a method to compute optimal torques for this setting.

Additionally, implicit network structure can be extracted from the complex system 700 by examination of coupled differential equations (element 716).

Non-limiting examples of complex systems 700 that can be controlled via the processor 104 include a motor vehicle or a motor vehicle component (electrical, non-electrical, mechanical) or actuator, such as a brake, a steering mechanism, suspension, or safety device (e.g., airbags, seatbelt tensioners, etc.). In this context, an actuator is a component of a machine (or complex system 700) that is responsible for moving and controlling a mechanism or system. An actuator requires a control signal and a source of energy, such as a battery or motor. Further, the vehicle could be an unmanned aerial vehicle (UAV), an autonomous self-driving ground vehicle, or a human operated vehicle controlled either by a driver or by a remote operator. For instance, upon generating control commands for the vehicle based on the linear control system, the system can cause the autonomous vehicle to perform a driving operation/maneuver (such as steering or another command) in line with driving parameters. For example, if the system recognizes a bicyclist, another vehicle, or a pedestrian via a set of vehicle sensors, the system described herein can cause a vehicle maneuver/operation to be performed to avoid a collision with the bicyclist or vehicle (or any other object that should be avoided while driving). The system can cause the autonomous vehicle to apply a functional movement response, such as a braking operation followed by a steering operation, to redirect vehicle away from the object, thereby avoiding a collision.

Other appropriate responses may include one or more of a steering operation, a throttle operation to increase speed or to decrease speed, or a decision to maintain course and speed without change. The responses may be appropriate for avoiding a collision, improving travel speed, or improving efficiency. As can be appreciated by one skilled in the art, control of other device types is also possible. Thus, there are a number of automated actions that can be initiated by the autonomous vehicle given the particular object detected and the circumstances in which the system is implemented. Furthermore, the system can be applied to any autonomous system, such as a robot, to cause the robot to perform mechanical operations, such as picking up an object with a robotic arm, moving, and avoiding a collision.

In addition, another useful application of the invention described herein is recalibration for systems that change their dynamics. Non-limiting examples include a vehicle that takes on more passengers or a balanced/unbalanced payload, and a robotic arm that moves to pick up an object). Moreover, vehicle dynamics often change based on factors, such as road conditions (e.g., ice, gravel, dry/wet pavement, mud), tire information (e.g., tread wear, tire pressure), and wind gusts. Based on changes in vehicle dynamics, the system can cause a vehicle operation, such as those described above, to adjust to any detected instabilities or mechanical changes.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A control command system for generating control commands for a vehicle, the system comprising:
   one or more processors and a non-transitory computer-readable medium having executable instructions encoded thereon such that when executed, the one or more processors perform an operation of:
      receiving, as input, a networked control system corresponding to a network of subsystems comprising sensors and actuators of the vehicle and data collected from the sensors;
      forming a plurality of subsystems from the networked control system;
      applying a dynamic mode decomposition with control (DMDc) process to each subsystem, yielding a plurality of linear approximations, one linear approximation for each subsystem;
      combining the plurality of linear approximations into a single linear approximation for the networked control system;
      outputting a linear control system approximating the networked control system; and
      generating control commands for the vehicle based on the linear control system, wherein the control commands cause the vehicle to perform a vehicle operation.

2. The system as set forth in claim 1, wherein the networked control system comprises a network structure having a plurality of vertices, each vertex representing a state space of a subsystem of the vehicle, wherein a directed edge connecting a pair of vertices represents a situation in which a state of a first vehicle component has a direct dynamical effect on a state of a second vehicle component.

3. The system as set forth in claim 2, wherein the DMDc process is only applied to connected vertices.

4. The system as set forth in claim 1, wherein the networked control system comprises a directed graph with vertices partitioned into two disjoint sets: a set of system components, N =v1, . . . ,uv, and a set of inputs, I=e1, . . . ,eµ,wherein edges connected to the vertices in the set of inputs are only directed outward from those vertices.

5. The system as set forth in claim 4, wherein each vertex w in NUI is associated with a set Pw that represents a component of the networked control system, wherein if w∈N, then Pw is a component of a state space of the networked control system, while if w∈I, then Pw is a component of an input space of the networked control system.

6. A computer implemented method for generating control commands for a vehicle, the method comprising an act of:
   causing one or more processors to execute instructions encoded on a non-transitory computer-readable medium, such that upon execution, the one or more processors perform operations of:
      receiving, as input, a networked control system corresponding to a network of subsystems comprising sensors and actuators of the vehicle and data collected from the sensors;
      forming a plurality of subsystems from the networked control system;
      applying a dynamic mode decomposition with control (DMDc) process to each subsystem, yielding a plurality of linear approximations, one linear approximation for each subsystem;
      combining the plurality of linear approximations into a single linear approximation for the networked control system;
      outputting a linear control system approximating the networked control system; and p1 generating control commands for the vehicle based on the linear control system, wherein the control commands cause the vehicle to perform a vehicle operation.

7. The method as set forth in claim 6, wherein the networked control system comprises a network structure having a plurality of vertices, each vertex representing a state space of a subsystem of the vehicle, wherein a directed edge connecting a pair of vertices represents a situation in which a state of a first vehicle component has a direct dynamical effect on a state of a second vehicle component.

8. The method as set forth in claim 7, wherein the DMDc process is only applied to connected vertices.

9. The method as set forth in claim 6, wherein the networked control system comprises a directed graph with vertices partitioned into two disjoint sets: a set of system components, N =v1, . . . ,uv, and a set of inputs, I=e1, . . . ,eµ, wherein edges connected to the vertices in the set of inputs are only directed outward from those vertices.

10. The method as set forth in claim 9, wherein each vertex w in NUI is associated with a set Pw that represents a component of the networked control system, wherein if w∈N, then Pw is a component of a state space of the networked control system, while if w∈I, then Pw is a component of an input space of the networked control system.

11. A computer program product for generating control commands for a vehicle, the computer program product comprising:
   computer-readable instructions stored on a non-transitory computer-readable medium that are executable by a computer having one or more processors for causing the processor to perform operations of:
      receiving, as input, a networked control system corresponding to a network of subsystems comprising sensors and actuators of the vehicle and data collected from the sensors;

forming a plurality of subsystems from the networked control system;

applying a dynamic mode decomposition with control (DMDc) process to each subsystem, yielding a plurality of linear approximations, one linear approximation for each subsystem;

combining the plurality of linear approximations into a single linear approximation for the networked control system;

outputting a linear control system approximating the networked control system; and generating control commands for the vehicle based on the linear control system, wherein the control commands cause the vehicle to perform a vehicle operation.

12. The computer program product as set forth in claim 11, wherein the networked control system comprises a network structure having a plurality of vertices, each vertex representing a state space of a subsystem of the vehicle, wherein a directed edge connecting a pair of vertices represents a situation in which a state of a first vehicle component has a direct dynamical effect on a state of a second vehicle component.

13. The computer program product as set forth in claim 12, wherein the DMDc process is only applied to connected vertices.

14. The computer program product as set forth in claim 11, wherein the networked control system comprises a directed graph with vertices partitioned into two disjoint sets: a set of system components, $N=v_1, \ldots, v_u$, and a set of inputs, $I=e_1, \ldots, e_\mu$, wherein edges connected to the vertices in the set of inputs are only directed outward from those vertices.

15. The computer program product as set forth in claim 14, wherein each vertex w in N∪I is associated with a set $P_w$ that represents a component of the networked control system, wherein if w∈N, then $P_w$ is a component of a state space of the networked control system, while if w∈I, then $P_w$ is a component of an input space of the networked control system.

* * * * *